(12) United States Patent
Maheshwari et al.

(10) Patent No.: US 10,346,281 B2
(45) Date of Patent: Jul. 9, 2019

(54) OBTAINING AND ANALYZING A REDUCED METRIC DATA SET

(71) Applicant: Oracle International Corporation, Redwood Shores, CA (US)

(72) Inventors: Arvind Maheshwari, Pleasanton, CA (US); Ganesh Narayanamurthy, Hyderabad (IN); Rishi Saraswat, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 407 days.

(21) Appl. No.: 14/939,634

(22) Filed: Nov. 12, 2015

(65) Prior Publication Data
US 2017/0139803 A1    May 18, 2017

(51) Int. Cl.
*G06F 11/34* (2006.01)

(52) U.S. Cl.
CPC ............... *G06F 11/3495* (2013.01)

(58) Field of Classification Search
CPC .................. G06F 21/00; G06F 21/50
See application file for complete search history.

(56) References Cited

U.S. PATENT DOCUMENTS

| | | | |
|---|---|---|---|
| 7,926,043 B2 * | 4/2011 | Vaswani | G06F 11/3466 717/130 |
| 8,612,377 B2 | 12/2013 | Beg et al. | |
| 8,881,145 B2 * | 11/2014 | Chiueh | G06F 9/45504 709/223 |
| 9,021,448 B1 * | 4/2015 | Gagliardi | G06F 8/70 717/128 |
| 9,304,663 B1 * | 4/2016 | Guo | G06F 3/0482 |
| 9,329,980 B2 * | 5/2016 | Baril | G06F 11/3688 |
| 9,600,523 B2 * | 3/2017 | Sankar | G06F 17/30489 |
| 9,686,150 B2 * | 6/2017 | Gesmann | H04L 41/5009 |

(Continued)

OTHER PUBLICATIONS

Al-Kandari, Noriah, "Variable Selection and Principal Component Analysis", International Statistical Institute, Proceedings, Finland, 1999, 2 pages.

(Continued)

*Primary Examiner* — Saleh Najjar
*Assistant Examiner* — Devin E Almeida
(74) *Attorney, Agent, or Firm* — Invoke (57) ABSTRACT

Methods for obtaining and analyzing a reduced data set are disclosed. In an embodiment, runtime dependencies between components are identified. Based on runtime dependencies, it is determined that a first component is configured to access a second component during runtime but is not configured to access a third component during the runtime. A subset of monitoring data associated with the second component is reported. A subset of the monitoring data associated with the third component is not reported. In an embodiment, a first data set associated with a component is obtained. The first data set is aggregated by monitoring of the component. A second data set, associated with the component, is simulated. The second data set is simulated based on the first data set and/or data modeling associated with the component. A characteristic and/or performance of the component is analyzed based on the first data set and the second data set.

19 Claims, 4 Drawing Sheets

(56) References Cited

U.S. PATENT DOCUMENTS

| | | | | |
|---|---|---|---|---|
| 2003/0117971 | A1* | 6/2003 | Aubury | G06F 17/5022 370/321 |
| 2005/0091640 | A1* | 4/2005 | McCollum | G06F 11/0709 717/117 |
| 2005/0172306 | A1* | 8/2005 | Agarwal | G06F 11/008 719/328 |
| 2008/0104212 | A1* | 5/2008 | Ebrom | D06F 39/005 709/222 |
| 2008/0288651 | A1* | 11/2008 | Brauel | G06F 11/3495 709/230 |
| 2009/0070280 | A1* | 3/2009 | Beygelzimer | G06F 11/3495 706/13 |
| 2012/0005237 | A1* | 1/2012 | Obata | G06F 9/45537 707/798 |
| 2015/0074808 | A1* | 3/2015 | Quinn | H04L 63/20 726/23 |
| 2016/0019102 | A1* | 1/2016 | Cui | G06F 9/542 719/328 |
| 2016/0378615 | A1* | 12/2016 | Cohen | G06F 11/1469 714/19 |

OTHER PUBLICATIONS

Cadima et al., "The Subselect R Package", Version 0.12, May 15, 2012, pp. 1-35.

Jolliffe, I. T., "Discarding Variables in a Principal Component Analysis. I: Artificial Data", Journal of the Royal Statistical Society, Series C (Applied Statistics), vol. 21, No. 2, 1972, pp. 160-173.

King et al., "Variable Selection in Large Environmental Data Sets Using Principal Components Analysis", Environmetrics, vol. 10, 1999, pp. 67-77.

Polly, P. David, "Procrustes, PCA, and 3D Coordinates", Department of Geological Sciences, Indiana University, Copyright 2012, 40 pages.

SAS, "Principal Component Analysis", Available online at <http://support.sas.com/publishing/pubcat/chaps/55129.pdf>, retrieved on Jan. 26, 2016, pp. 1-56.

Siswadi et al., "Variable Selection Using Principal Component and Procrustes Analyses and Its Application in Educational Data", Journal of Asian Scientific Research, vol. 2, No. 12, 2012, pp. 856-865.

* cited by examiner

OBTAINING AND ANALYZING A REDUCED METRIC DATA SET

TECHNICAL FIELD

The present disclosure relates to metric data for a target system. In particular, the present disclosure relates to obtaining and analyzing a reduced metric data set.

BACKGROUND

Applications monitor many metrics of a computing system. Metrics include, for example, a response time of a component of a computing system, a throughput of a component, and an error rate of a component. As computing systems grow larger and move to cloud environments, the number of metrics that may be monitored and the volume of data that may be detected is increasing.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. REDUCING THE VOLUME OF A METRIC DATA SET
4. SIMULATING AND ANALYZING A REDUCED METRIC DATA SET
5. EXAMPLE EMBODIMENT
6. MISCELLANEOUS; EXTENSIONS
7. HARDWARE OVERVIEW

1. General Overview

In one or more embodiments, a data set associated with monitoring of a first component of a target system is filtered in order to reduce the volume of a metric data set corresponding to the target system. A second component, which has all necessary permissions to access the first component, may or may not have runtime dependencies on the first component. The data set associated with monitoring of the first component is discarded, sampled, and/or compressed, if the second component of the target system does not have any runtime dependencies on the first component. Runtime dependencies may be determined based on various factors, including but not limited to a topology graph associated with the target system, one or more current configurations associated with components of the target system, the functionality of the particular component, whether the first component has been deployed and/or instantiated, an access log associated with the first component, whether communications associated with the second component include an identifier of the first component, and whether a product generated by the second component depends on the first component.

In one or more embodiments, a first data set that is a sampled and/or compressed version of a data set associated with monitoring of a particular component of a target system is obtained. A second data set, also associated with the particular component, is simulated based on one or more of: the first data set or a data model associated with the particular component. Characteristics and/or performance of the particular component are analyzed based on the first data set and the second data set.

2. Architectural Overview

Figure 1:
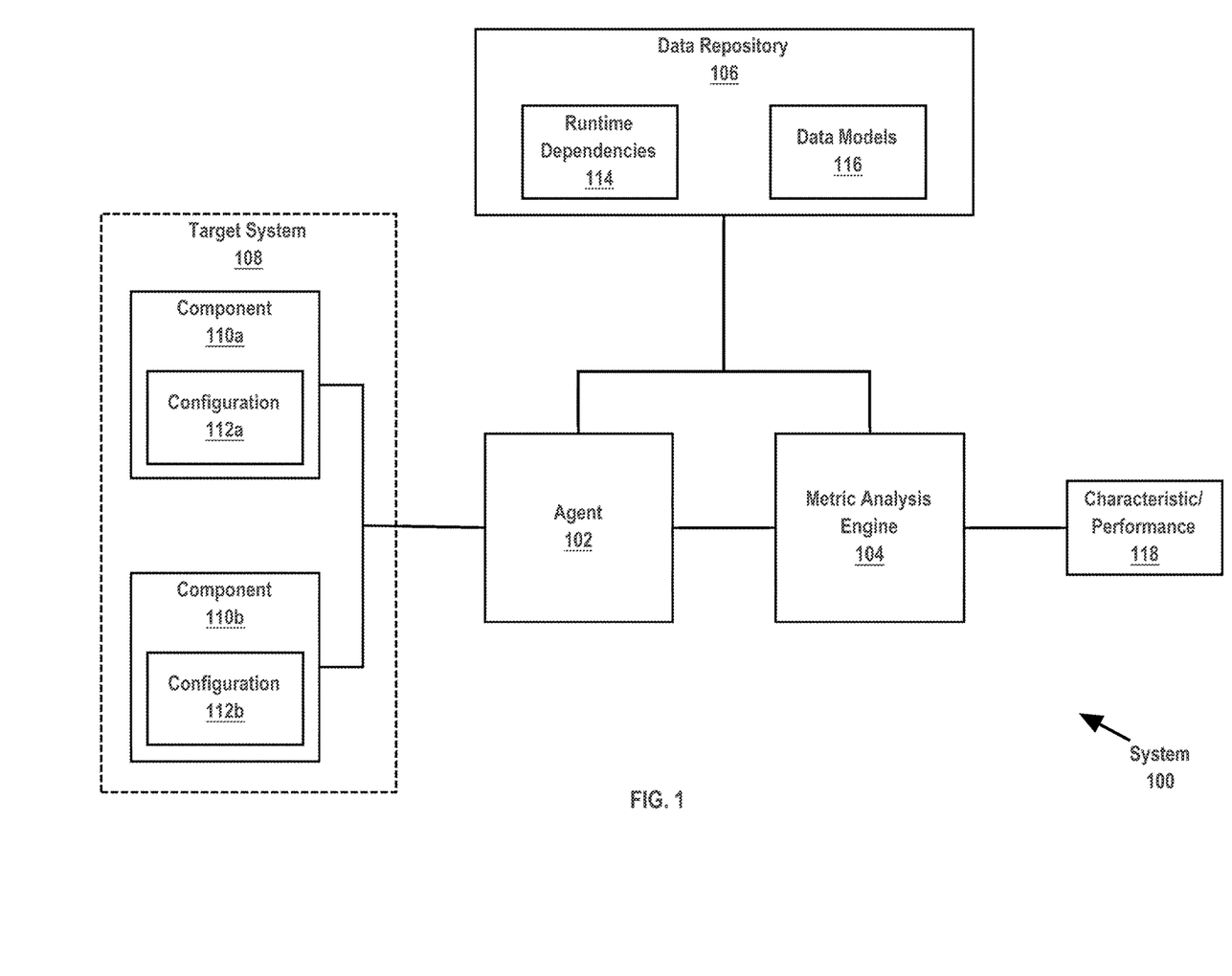
FIG. 1 illustrates a system in accordance with one or more embodiments.

FIG. 1 illustrates a system 100 in accordance with one or more embodiments. As illustrated in FIG. 1, system 100 includes an agent 102, a metric analysis engine 104, a data repository 106, and a target system 108. In one or more embodiments, system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, target system 108 refers to a system that is to be monitored and/or analyzed by agent 102 and/or metric analysis engine 104. Multiple target systems may be included in system 100. The target systems may be monitored by one or more agents. Target system 108 includes one or more components (such as component 110*a* or component 110*b*).

In one or more embodiments, a component (such as component 110*a* or component 110*b*) refers to an element or identifiable part of target system 108. A component may be implemented in hardware and/or software. Examples of hardware components include but are not limited to a processor, a server, and a database. Examples of software components include but are not limited to an application, a module, a service, and/or a feature. In an embodiment, component 110*a* and component 110*b* are different applications. In another embodiment, component 110*a* and 110*b* are modules of a same application. In another embodiment, component 110*a* is a particular application, and component 110*b* is a module of the particular application.

In an embodiment, a component is associated with one or more metrics, which are monitored by agent 102. Example metrics include but are not limited to a throughput, a fault or error code, a response or returned data value, a response time, an availability of a component, and a capacity of a component.

In an embodiment, a component is associated with a current configuration (such as configuration 112a or configuration 112b). The current configuration indicates settings and/or attributes of the component. In an embodiment, configuration 112a and/or configuration 112b includes a flag indicating whether component 110a is configured to access component 110b. The flag may be set to ON or OFF. In another embodiment, configuration 112a and/or configuration 112b indicates whether runtime dependencies 114 exist between component 110a and component 110b. In another embodiment, component 110a is a particular application, and component 110b is a module of the particular application. Configuration 112b, associated with component 110b, is generated, maintained, and/or stored by component 110a.

In an embodiment, a component is associated with a set of source code, or other expressions of logic performed by the component. Code of component 110a indicates whether component 110a has functionality to access component 110b.

In an embodiment, a component is associated with an access log. The access log indicates whether component 110a has historically accessed component 110b.

In an embodiment, a component is used in generating a particular product. The particular product indicates one or more other components that were used or accessed in generating the particular product.

In one or more embodiments, data repository 106 is any type of storage unit and/or device (e.g., a file system, database, collection of tables, or any other storage mechanism) for storing data. Further, data repository 106 may include multiple different storage units and/or devices. The multiple different storage units and/or devices may or may not be of the same type or located at the same physical site. Further, data repository 106 may be or may execute on the same computing system as agent 102 and/or metric analysis engine 104. Alternatively or additionally, data repository 106 may be on a separate computing system than agent 102 and/or metric analysis engine 104. Data repository 106 may be connected to agent 102 and/or metric analysis engine 104 via a direct connection or via a network.

Data sets describing one or more runtime dependencies 114 and one or more data models 116 may be implemented across any of components within system 100. However, these data sets are illustrated within data repository 106 for purposes of clarity and explanation.

In one or more embodiments, runtime dependencies 114 are dependencies between components of target system 108 (such as component 110a and component 110b) at runtime. A first component has a runtime dependency on a second component if the first component accesses the second component during runtime. In an embodiment, runtime dependencies 114 are indicated by a topology graph. A topology graph describes an overall architecture, arrangement, setting, and/or usage of the components of target system 108.

In one or more embodiments, data model 116 is an expected value or range of a data set associated with a metric of a component of target system 108. In an embodiment, data model 116 is generated based on historic data sets associated with the metric. In another embodiment, data model 116 is specified via user input.

In one or more embodiments, agent 102 refers to hardware and/or software configured to monitor target system 108 and to collect a data set for a metric of a component of target system 108. Agent 102 may also monitor and collect data for additional target systems (not shown). Alternatively or additionally, multiple agents may be used in system 100.

In an embodiment, agent 102 is configured to filter collected data sets. Filtering includes discarding, sampling, and/or compressing the collected data sets. Agent 102 is configured to transmit the filtered data sets to metric analysis engine 104. Example operations for reducing the volume of a metric data set is described below with reference to FIG. 2A.

In an embodiment, agent 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, and a personal digital assistant ("PDA").

In one or more embodiments, metric analysis engine 104 refers to hardware and/or software configured to obtain and analyze data sets for metrics of one or more components of target system 108. Metric analysis engine 104 may also obtain and analyze data sets associated with other target systems (not shown).

In an embodiment, metric analysis engine 104 is configured to simulate a data set for a metric of a component, based on (a) a data set obtained from agent 102, and/or (b) data models 116. Metric analysis engine 104 is configured to analyze a characteristic and/or performance associated with target system 108 or a component thereof, using the data set obtained from agent 102 and the simulated data set. Example operations for simulating and analyzing a reduced metric data set are described with reference to FIG. 2B. In an embodiment, metric analysis engine 104 is implemented on one or more digital devices.

In an embodiment, metric analysis engine 104 is configured to filter the data set obtained from agent 102 and/or the simulated data set based on whether the corresponding metric is statistically significant. Metric analysis engine 104 transmits a control signal to agent 102 indicating whether the corresponding metric is statistically significant.

3. Reducing the Volume of a Metric Data Set

Figure 2A:
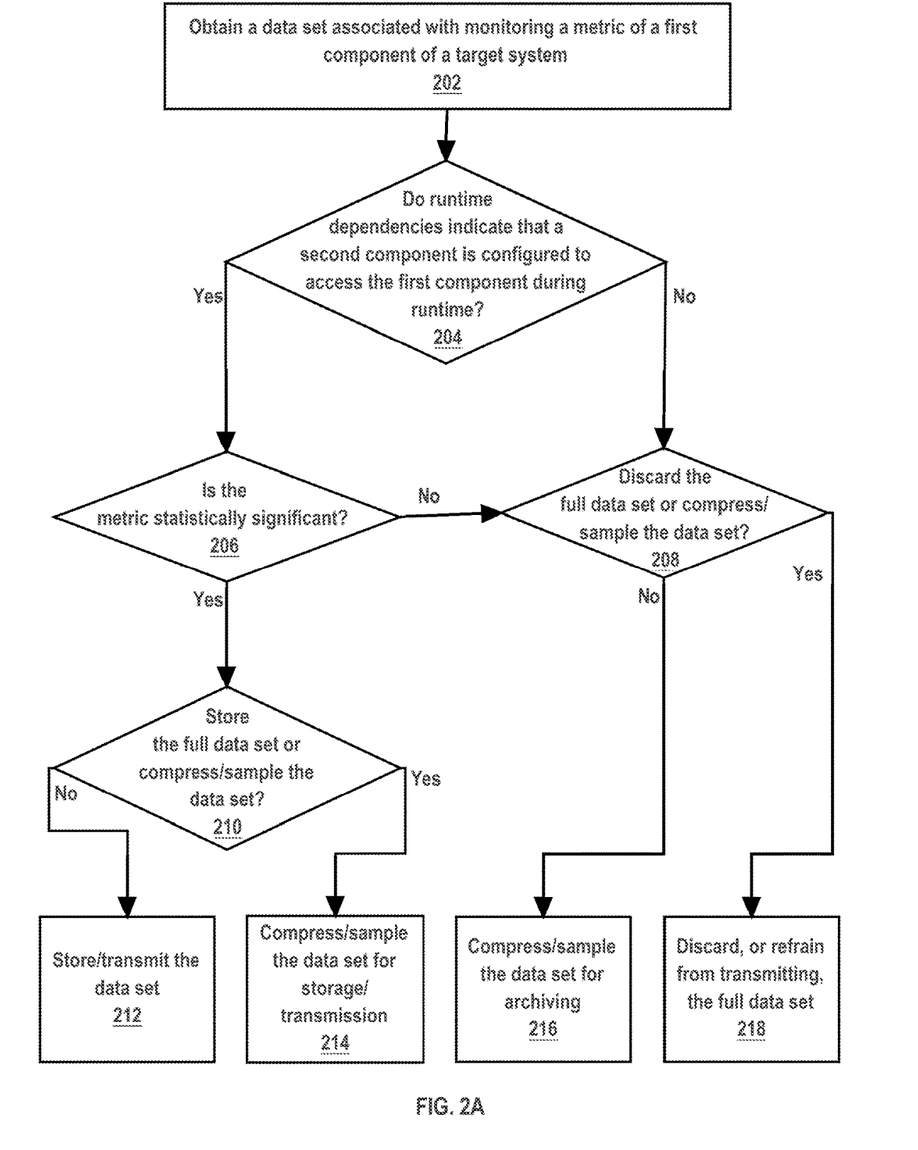
FIG. 2A illustrates an example set of operations for reducing the volume of a metric data set in accordance with one or more embodiments.

FIG. 2A illustrates an example set of operations for reducing the volume of a metric data set in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

Initially, a data set associated with monitoring a metric of a first component of a target system is obtained, in accordance with one or more embodiments (Operation 202). The data set is detected using a probe or another script. In an example, a probe monitors function calls made from a first component to a second component and determines a response time associated with each function call. In another example, a probe monitors and collects error messages returned from a particular component.

In one or more embodiments, an inquiry is made as to whether runtime dependencies indicate that a second component is configured to access the first component during runtime (Operation 204). Various types of information may be used in making the inquiry.

In an embodiment, a topology graph associated with the target system is used to determine whether runtime dependencies exist between the first component and the second component. In an example, a topology graph indicates that the operations of a first application (e.g., Java Virtual Machine (JVM)) depend on the operations of a second application (e.g., a particular database (DB)) at runtime. Then, it is determined that runtime dependencies indicate that the JVM is configured to access the DB.

In an embodiment, a current configuration associated with the first component and/or the second component is used to determine whether runtime dependencies exist between the first component and the second component. In an example, an application (e.g., a WebLogic Server (WLS)) has a particular service (e.g., Java Message Service (JMS)). A configuration of the JMS is stored on the WLS. Based on the configuration of the JMS stored on the WLS, it is determined that runtime dependencies exist between the WLS and the JMS, and that the WLS is configured to access the JMS. If no configuration of the JMS is stored on the WLS, it is determined that the WLS is not configured to access the JMS.

In an embodiment, whether runtime dependencies exist between the first component and the second component depends on a functionality of the second component. If source code executed by the second component provides functionality to access the first component, then runtime dependencies exist between the second component and the first component. Examples of functions that access the first component include a request to transmit data to the first component, a request to the first component to perform an operation, and a request to receive data from the first component.

In an embodiment, whether runtime dependencies exist between the first component and the second component depends on whether the first component has been deployed. Deploying the first component includes generating a file of a particular type associated with the first component. In an example, component x of a target system uses a particular logical database of a file type T. When component x is deployed, the particular logical database is instantiated. A file of file type T is then generated and stored. A search is performed to determine whether a file of file type T exists within the target system. If a file of file type T is found, then it is determined that component x has been deployed. Hence, it is determined that runtime dependencies indicate that component y is configured to access component x.

In an embodiment, an access log associated with the first component and/or the second component is used to determine whether runtime dependencies exist between the first component and the second component. In an example, each time component x is accessed by another component, an entry is stored in an access log of component x. A historical record of the components that accessed component x is maintained. If the access log indicates that component y accessed component x in a prior time period (e.g., during runtime), then it is determined that runtime dependencies exist between component y and component x.

In an embodiment, whether runtime dependencies exist between the first component and the second component depends on whether there are any communications between the first component and the second component. Communications between various components of the target system are monitored and/or intercepted. An identifier of a source of a data packet is indicated in one address field of the data packet. An identifier of a recipient of the data packet is indicated in another address field of the data packet. For each data packet that is monitored, a source and a recipient are identified. If the source is the first component and the recipient is the second component, or the source is the second component and the recipient is the first component, then it is determined that runtime dependencies exist between the second component and the first component.

In an embodiment, a product generated by the target system is used to determine whether runtime dependencies exist between the first component and the second component. If the product was generated using both the first component and the second component, then it is determined that runtime dependencies exist between the first component and the second component.

In an example, a product generated by a target system includes identifiers of components that were used in generating the product. The components used in generating the product include component x and component y. Then, it is determined that runtime dependencies exist between component x and component y.

In another example, a product generated by a target system is a report of the residential address of employees of a particular company. The report includes a logo of the particular company. The residential address of employees is maintained by component x. The logo of the particular company is maintained by component y. Since the report includes information that is maintained by both component x and component y, it is determined that runtime dependencies exist between component x and component y.

In one or more embodiments, if runtime dependencies indicate that the second component is configured to access the first component, then an inquiry is made as to whether the metric (associated with the data set that was obtained at Operation 202) is statistically significant, as compared to other metrics associated with the target system, for determining a characteristic and/or performance associated with the target system (Operation 206). In an embodiment, a database or other memory indicates whether the metric is statistically significant, and a look-up of the database is performed. The database was generated based on one or more control signals, which were obtained locally (e.g., from another local module or application) or via a network (e.g., the Internet). The control signals were determined based on statistical analyses of data sets for metrics associated with the target system. Examples of statistical analyses are described below with reference to Operation 226 of FIG. 2B.

In one or more embodiments, if the metric is statistically significant, then an inquiry is made as to whether to store the full data set or to compress and/or sample the data set (Operation 210). The determination is based on a system setting, specified via user input.

In one or more embodiment, if the full data set is to be stored, then the full data set is stored or transmitted (Operation 212). The full data set is stored for the purpose of analyzing a characteristic and/or performance associated with the target system, which is described below with reference to FIG. 2B. Alternatively, the full data set is transmitted to another entity that is configured to analyze a characteristic and/or performance associated with the target system.

In an embodiment, data sets that are stored or transmitted include additional data sets (not shown in FIG. 2A). In an example, a particular metric is specified, via user input, as a metric to be included in analyzing a characteristic and/or performance associated with the target system. Data sets for the particular metric are stored or transmitted, regardless of a component associated with the particular metric and a statistical significance of the particular metric.

In one or more embodiments, if the data set is to be compressed and/or sampled, then the data set is compressed and/or sampled for storage or transmission (Operation 214). In an embodiment, compressing and/or sampling is based on a data model associated with the metric. An inquiry is made as to whether the data set matches the data model. For each portion of the data set that matches the corresponding portion of the data model, that portion of the data set is discarded. For each portion of the data set that does not match the corresponding portion of the data model, that portion of the data set is stored.

In an example, a data set for a particular metric (e.g., throughput of a server) includes the hourly throughput over one day. Historical data sets are collected over a one-month time period. The throughput corresponding to each hour is averaged over the month to generate a data model. The data model indicates as follows:

(A) The average throughput at 9 AM is 100 Mbps,
(B) The average throughput at 10 AM is 150 Mbps,
(C) The average throughput at 11 AM is 90 Mbps.

Subsequently, the server is monitored, and a data set is collected, as follows:

(A) The throughput at 9 AM is 100 Mbps,
(B) The throughput at 10 AM is 150 Mbps,
(C) The throughput at 11 AM is 110 Mbps.

The throughput at 9 AM, indicated by the data set, matches the average throughput at 9 AM, indicated by the data model (100 Mbps). Similarly, the throughput at 10 AM, indicated by the data set, matches the average throughput at 10 AM, indicated by the data model (150 Mbps). Thus, the portions of the data set corresponding to the throughput at 9 AM and the throughput at 10 AM are discarded. Meanwhile, the throughput at 11 AM, indicated by the data set, does not match the average throughput at 11 AM, indicated by the data model. Thus, the portion of the data set corresponding to the throughput at 11 AM is stored. The filtered data set includes the following:

(A) The throughput at 11 AM is 110 Mbps.

In an embodiment, compressing and/or sampling of the data set is based on the data set itself. In an example, a data set, collected on a particular day, for a particular metric (e.g., throughput of a server) includes repeating information. The data set as collected is as follows:

(A) The throughput at 9 AM is 100 Mbps,
(B) The throughput at 10 AM is 100 Mbps,
(C) The throughput at 11 AM is 100 Mbps.

Each repeating piece of information is aggregated into one data point, indicating the value that was repeating and the duration over which the value repeated. The filtered data set includes the following:

(A) The throughput from 9 AM to 11 AM is 100 Mbps.

In another example, a data set, collected on a particular day, for a particular metric (e.g., throughput of a server) follows a particular pattern. The data set increases by 50 Mbps per hour, as follows:

(A) The throughput at 9 AM is 100 Mbps,
(B) The throughput at 10 AM is 150 Mbps,
(C) The throughput at 11 AM is 200 Mbps.

Rather than specifying the throughput every hour, the filtered data set includes a description of the particular pattern of the collected data set. The filtered data set includes the following:

(A) The throughput at 9 AM is 100 Mbps and increases by 50 Mbps per hour until 11 AM.

In an embodiment, the reduced data set is stored for analyzing a characteristic and/or performance associated with the target system, as described below with reference to FIG. 2B. Alternatively, the reduced set is transmitted to another entity that is configured to analyze a characteristic and/or performance associated with the target system.

In one or more embodiments, if it is determined that runtime dependencies do not indicate that the second component is configured to access the first component at Operation 204, or it is determined that the metric is not statistically significant at Operation 206, then an inquiry is made as to whether to discard the full data set or to compress and/or sample the data set (Operation 208). The determination is made based on a system setting, specified via user input.

In one or more embodiments, if the full data set is to be discarded, then the full data set is deleted from memory, or the full data set is not transmitted to another entity that is configured to analyze a characteristic and/or performance associated with the target system (Operation 218).

In one or more embodiments, if the data set is to be compressed and/or sampled, then the data set is compressed and/or sampled for archiving (Operation 216). Examples of compressing and/or sampling the data set are described above with reference to Operation 214. The reduced data set is stored for archiving purposes, rather than for analyzing a characteristic and/or performance associated with the target system.

Simulating and Analyzing a Reduced Metric Data Set

Figure 2B:
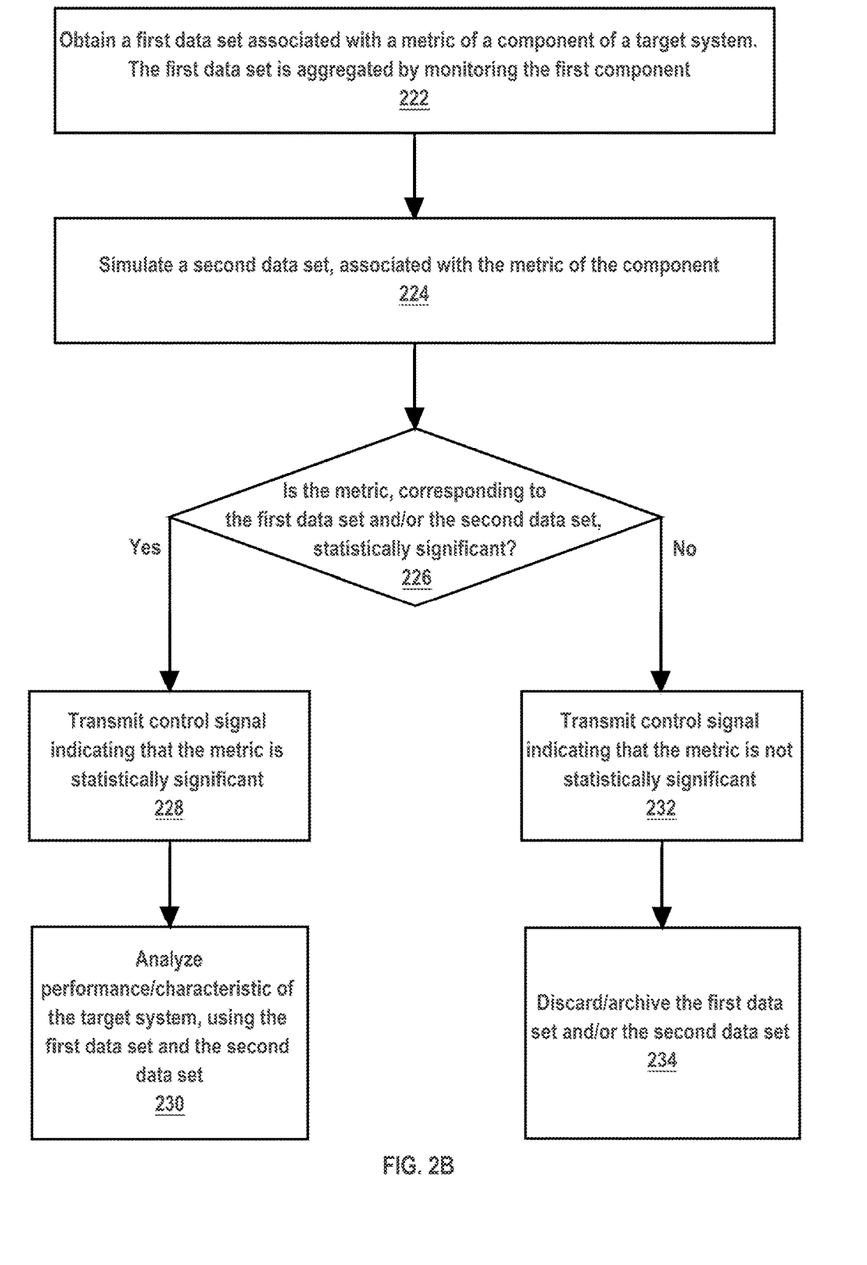
FIG. 2B illustrates an example set of operations for simulating and analyzing a reduced metric data set in accordance with one or more embodiments.

FIG. 2B illustrates an example set of operations for simulating and analyzing a reduced metric data set in accordance with one or more embodiments. One or more operations illustrated in FIG. 2B may be modified, rearranged, or omitted all together. Accordingly, the particular sequence of operations illustrated in FIG. 2B should not be construed as limiting the scope of one or more embodiments Initially, a first data set associated with monitoring a metric of a component of a target system is obtained. The first data set is aggregated by monitoring the component (Operation 222). In an embodiment, the first data set is obtained locally or via a network. In an example, the first data set is received from another entity that is configured to monitor the component of the target system.

In an embodiment, the first data set is aggregated using the operations described with reference to FIG. 2A. The first data set is a compressed and/or sampled version of the full data set that was obtained via monitoring the metric of the component. The compression and/or sampling was performed based on a data model associated with the metric and/or the full data set itself.

In one or more embodiments, a second data set, associated with the metric of the component, is simulated (Operation 224). The second data set is simulated based on the data model associated with the metric and/or the first data set.

In an embodiment, the second data set is simulated based on the data model associated with the metric. Information omitted from the first data set is obtained from the data model.

In an example, a data set for a particular metric (e.g., throughput of a server) includes the hourly throughput over one day. Historical data sets are collected over a one-month time period. The throughput corresponding to each hour is averaged over the month to generate a data model. The data model indicates as follows:

(A) The average throughput at 9 AM is 100 Mbps,
(B) The average throughput at 10 AM is 150 Mbps,
(C) The average throughput at 11 AM is 90 Mbps.

Subsequently, a data set associated with the throughput of the server is obtained. The obtained data set includes the following:

(A) The throughput at 11 AM is 110 Mbps.

The throughput at 9 AM and the throughput at 10 AM have been omitted from the obtained data set. Using the data model, the throughput at 9 AM is determined to be 100 Mbps, and the throughput at 10 AM is determined to be 150 Mbps. The simulated data set includes the following:

(A) The throughput at 9 AM is 100 Mbps, (B) The throughput at 10 AM is 150 Mbps.

In an embodiment, the second data set is simulated based on the first data set, which indicates a particular pattern in the full data set associated with the metric. The second data set is simulated based on the particular pattern.

In an example, a data set associated with a particular metric (e.g., throughput of a server) is obtained. The obtained data set includes the following:

(A) The throughput from 9 AM to 11 AM is 100 Mbps.

Using the pattern described by the obtained data set, the simulated data includes the following:

(A) The throughput at 9 AM is 100 Mbps, (B) The throughput at 10 AM is 100 Mbps, (C) The throughput at 11 AM is 100 Mbps.

In one or more embodiments, an inquiry is made as to whether the metric, corresponding to the first data set and/or the second data set, is statistically significant. In particular, the inquiry is made as to whether the metric is statistically significant, when compared to other metrics associated with the target system, for analyzing a characteristic and/or performance of the target system (Operation 226).

In an embodiment, Principal Component Analysis (PCA) is applied to the first data set and/or the second data set as well as data sets for other metrics associated with the target system. Using PCA, a set of Principal Components is determined. A Principal Component is a linear combination of weighted observed variables. The observed variables are the data sets for the metrics associated with the target system. The weights (also referred to herein as "metric loadings") are determined using eigenequations, such that no other weights could produce a set of Principal Components that are more successful in accounting for variance in the observed variables. Then, a subset of the Principal Components is selected based on a desired cumulative variance.

For each selected Principal Component, a metric with the highest loading is added to the selected set of metrics for the Principal Component. Then, a metric with the next highest correlation to the Principal Component is also added to the selected set of metrics for the Principal Component. Metrics are thus iteratively added to the selected set of metrics, for each Principal Component, until the selected sets of metrics cover the desired cumulative variance.

The selected sets of metrics are then determined as the metrics that are statistically significant for determining a characteristic and/or performance associated with the target system. The non-selected metrics are determined to be not statistically significant.

An inquiry is made as to whether the metric (corresponding to the first data set and/or the second data set) is within the selected sets of metrics, determined using PCA. If so, then the metric is statistically significant. If not, then the metric is not statistically significant.

In other embodiments, additional and/or alternative statistical analyses may be performed to determine whether the metric is statistically significant. The statistical analyses may be based on historical data sets for metrics of the target system, expected values for metrics of the target system, and/or other factors.

In one or more embodiments, if the metric is determined to be statistically significant, then a control signal indicating that the metric is statistically significant is transmitted (Operation 228). The control signal is transmitted locally or via a network. In an example, the control signal is transmitted to another entity that is configured to monitor the component of the target system.

In one or more embodiments, if the metric is determined to be statistically significant, a performance and/or characteristic associated with the target system is analyzed, using the first data set and the second data set (Operation 230). The performance and/or characteristic analyzed may be associated with the component (for which the first data set was obtained at Operation 222) or another component of the target system. In an example, the first data set and the second data set are presented in a performance report for the target system. In another example, the first data set and the second data set are monitored to determine whether to generate an alert associated with the target system. In another example, the first data set and the second data set are analyzed to determine whether there is a problem with the target system.

In one or more embodiments, if the metric is determined not to be statistically significant, then a control signal indicating that the metric is not statistically significant is transmitted (Operation 232). The control signal is transmitted locally or via a network. In an example, the control signal is transmitted to another entity that is configured to monitor the component of the target system.

In one or more embodiments, if the metric is determined not to be statistically significant, then the first data set and/or the second data set are discarded or archived (Operation 234). The first data set and/or the second data set are not used for analyzing a performance and/or characteristic associated with the target system. In an embodiment, a compressed and/or sampled version of the first data set and/or the second data set is archived. Examples of compressing and/or sampling a data set are described above with reference to Operation 214 of FIG. 2A.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

In an example, a server obtains monitoring data associated with a first database, storing current year financial information, and a second database, storing marketing information. A financial services application has permissions to access both the first database and the second database. A topology graph identifies runtime dependencies, indicating that the first database is being accessed by the financial services application during runtime and that the second database is not being accessed by the financial services application during runtime. Based on these runtime dependencies indicated by the topology graph, the server pushes out the monitoring data associated with the first database to an enterprise manager application without pushing out the monitoring data associated with the second database to the enterprise manager application.

In another example, a particular customer uses Application Suite X and Database Y, within a target system. Application A and Application B are offered within Application Suite X, however, the particular customer uses only Application A and not Application B.

A first agent device and a second agent device monitor the target system and collect data sets associated with the target system. The first agent device and the second agent device transmit the data sets to a metric analysis engine via the Internet. The metric analysis engine analyzes a characteristic and/or performance associated with the target system using the data sets.

The first agent device monitors Database Y, and runs a script to collect a first data set for an error rate associated with Database Y. An inquiry is made as to whether runtime dependencies indicate that Application Suite X is configured to access Database Y. A look-up of a topology graph is performed. The topology graph indicates that there is a runtime dependence between Application Suite X and Database Y. Based on the topology graph, it is determined that runtime dependencies exist between Application Suite X and Database Y.

The second agent device monitors Application Suite X, and runs a script to collect a second data set for a response time associated with Application A. An inquiry is made as to whether runtime dependencies indicate that Application Suite X is configured to access Application A. A look-up of a current configuration of Application A is performed. A current configuration of Application A is stored within Application Suite X. Based on the current configuration of Application A, it is determined that runtime dependencies exist between Application Suite X and Application A.

An inquiry is made as to whether the error rate associated with Database Y is statistically significant, as compared to other metrics associated with the target system. A look-up of a database is performed. The database indicates that the error rate associated with Database Y is statistically significant. The database was generated based on control signals received from the metric analysis engine. (The generation of the control signals by the metric analysis engine is described below.)

The first agent device compresses and samples the first data set for the error rate associated with Database Y, for transmission to the metric analysis engine. The first data set includes the following:
 (A) The error rate at 9 AM is 10%,
 (B) The error rate at 10 AM is 10%,
 (C) The error rate at 11 AM is 15%.

The first data set is compared to a data model for the error rate associated with Database Y. The data model for the error rate associated with Database Y was generated based on historical data. Over the past month, the average error rate was as follows:
 (A) The average error rate at 9 AM is 10%,
 (B) The average error rate at 10 AM is 13%,
 (C) The average error rate at 11 AM is 15%.

A first reduced data set, for the error rate associated with Database Y, omits information that matches the data model. Information for the error rate at 9 AM and the error rate at 11 AM matches the data model. The first reduced data set includes the following:
 (A) The error rate at 10 AM is 10%.

Another inquiry is made as to whether the response time associated with Application A is statistically significant, as compared to other metrics associated with the target system. Another look-up of the database is performed. The database indicates that the response time associated with Application A is not statistically significant.

The second agent device compresses and samples the second data set for the response time associated with Application A, for archiving. The second agent devices compresses and samples the second data set based on a particular pattern identified in the second data set. The second data set includes the following:
 (A) The response time at 9 AM is 0.1 ms,
 (B) The response time at 10 AM is 0.1 ms,
 (C) The response time at 11 AM is 0.1 ms.

A second reduced data set includes the following:
 (A) The response time from 9 AM to 11 AM is 0.1 ms.

The first agent device transmits the first reduced data set, for the error rate associated with Database Y, to the metric analysis engine via the Internet. The first reduced data set is transmitted to the metric analysis engine for analyzing a characteristic and/or performance of the target system.

The second agent device transmits the second reduced data set, for the response time associated with Application A, to metric analysis engine via the Internet. The second reduced data set is transmitted to the metric analysis engine for archiving.

The metric analysis engine receives the first reduced data set, for the error rate associated with Database Y. The metric analysis engine simulates a data set using the first reduced data set and the data model for the error rate associated with Database Y. The first reduced data set omits information for the error rate at 9 AM and the error rate at 11 AM. The error rate at 9 AM is populated with the average error rate at 9 AM indicated by the data model. The error rate at 11 AM is populated with the average error rate at 11 AM indicated by the data model. The simulated data set includes the following:
 (A) The error rate at 9 AM is 10%,
 (B) The error rate at 11 AM is 15%.

An inquiry is made as to whether the error rate associated with Database Y is statistically significant, as compared to other metrics associated with the target system (such as the response time associated with Application A). In particular, the inquiry is made as to whether the error rate associated with Database Y is statistically significant for determining a characteristic and/or performance associated with the target system. Principal Component Analysis (PCA) is applied to the first reduced data set for the error rate associated with Database Y, the simulated data set for the error rate associated with Database Y, and other data sets for other metrics associated with the target system (such as the second reduced data set for the response time associated with Application A). Using PCA, a set of Principal Components is selected based on a desired cumulative variance. In addition, metric loadings on the selected Principal Components are determined. For one of the selected Principal Components, a metric with the highest loading is the error rate associated with Database Y. Thus the error rate associated with Database Y is included in the selected set of metrics for the Principal Component. The error rate associated with Database Y is thus determined to be statistically significant.

The metric analysis engine transmits, to the first agent device, a control signal indicating that the error rate associated with Database Y is statistically significant. The first agent device stores the control signal in a database.

The metric analysis engine analyzes a characteristic and/or performance associated with the target system using the first reduced data set for the error rate associated with Database Y and the simulated data set for the error rate associated with Database Y. The metric analysis engine generates a performance report on the target system, presenting both the first reduced data set for the error rate associated with Database Y and the simulated data set for the error rate associated with Database Y. The performance reports includes the following information for the error rate associated with Database Y:
(A) The error rate at 9 AM is 10%,
(B) The error rate at 10 AM is 10%,
(C) The error rate at 11 AM is 15%.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
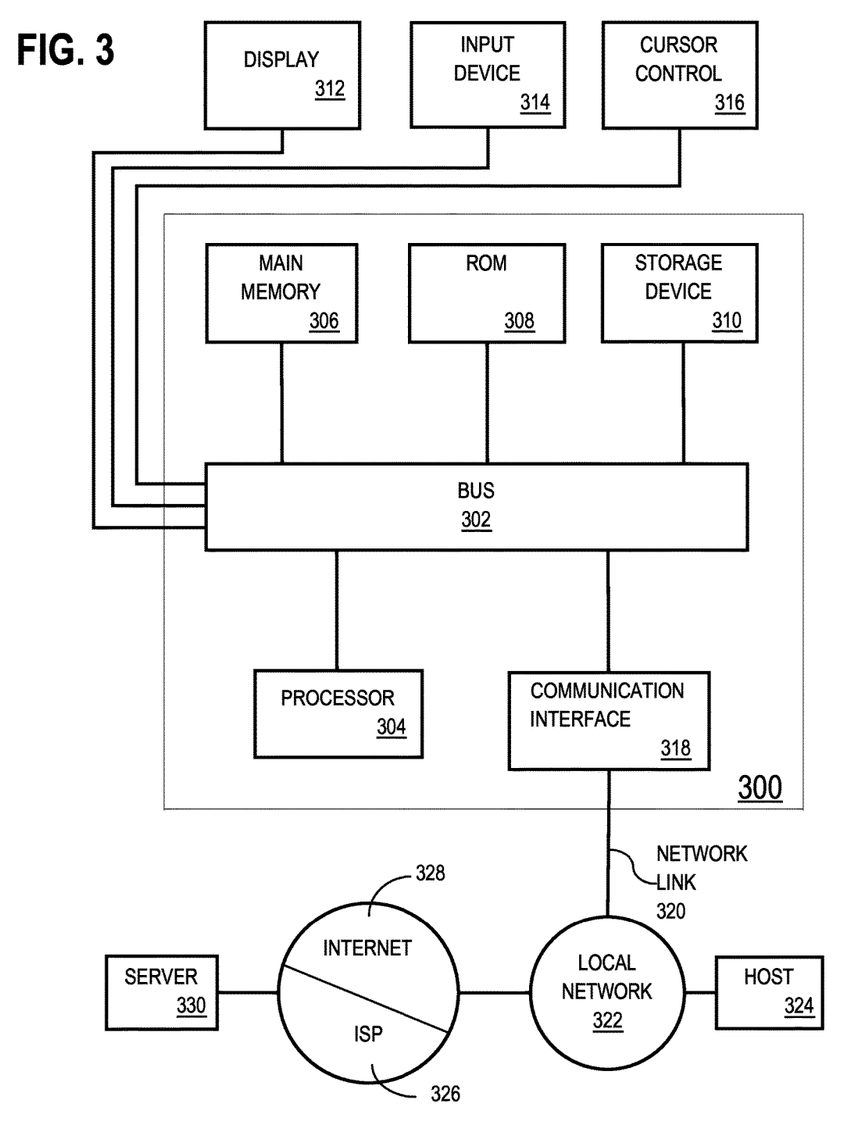
FIG. 3 shows a block diagram that illustrates a computer system in accordance with one or more embodiments.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   obtaining monitoring data associated with each of a plurality of components in a system;
   identifying a set of runtime dependencies between the plurality of components;
   transmitting information associated with a first component of the plurality of components, the transmitting operation comprising:
      based on the set of runtime dependencies, determining that the first component is configured to access a second component of the plurality of components during runtime;
      based on determining that the first component is configured to access the second component during the runtime, transmitting a first subset of the monitoring data that is associated with the second component;
      based on the set of runtime dependencies, determining that the first component is not configured to access a third component of the plurality of components during the runtime;
      based on determining that the first component is not configured to access the third component during the runtime, transmitting a first portion of the second subset of the monitoring data associated with the third component without transmitting a second portion of the second subset of the monitoring data associated with the third component;
      wherein the first subset of the monitoring data reflects an aspect of performance of the second component, and the second subset of the monitoring data reflects an aspect of performance of the third component;
   wherein the method is performed by at least one device including a hardware processor.

2. The method of claim 1, wherein the first component is associated with sufficient permissions to access both the second component and the third component.

3. The method of claim 1, further comprising: identifying the set of runtime dependencies based on one or more log files corresponding to the first component indicating access of one or more values associated with the second component.

4. The method of claim 1, further comprising: identifying the set of runtime dependencies by searching for at least one of: (a) identifiers that are stored in association with the first component and identify the second component and (b) identifiers that are stored in association with the second component and identify the first component.

5. The method of claim 1, further comprising: identifying the set of runtime dependencies based on a current configuration of the first component.

6. The method of claim 1, further comprising: identifying the set of runtime dependencies based on historical data indicating whether the first component has previously accessed the second component and whether the first component has previously accessed the third component.

7. The method of claim 1, further comprising: identifying the set of runtime dependencies based on whether the first component has generated a product that requires access to the second component and whether the first component has generated a product that requires access to the third component.

8. The method of claim 1, further comprising: identifying the set of runtime dependencies based on a topology graph associated with the system.

9. The method of claim 1, wherein the first component corresponds to a first application, the second component corresponds to a second application, and the third component corresponds to a third application.

10. The method of claim 1, wherein the first subset of the monitoring data associated with the second component is selected using Principal Component Analysis (PCA).

11. The method of claim 1, wherein the first subset of the monitoring data associated with the second component is compressed based on a data model prior to the transmitting operation.

12. A non-transitory computer readable medium comprising instructions which, when executed by one or more hardware processors, causes performance of operations comprising:
 obtaining monitoring data associated with each of a plurality of components in a system;
 identifying a set of runtime dependencies between the plurality of components;
 transmitting information associated with a first component of the plurality of components, the transmitting operation comprising:
  based on the set of runtime dependencies, determining that the first component is configured to access a second component of the plurality of components during runtime;
  based on determining that the first component is configured to access the second component during the runtime, transmitting a first subset of the monitoring data that is associated with the second component;
  based on the set of runtime dependencies, determining that the first component is not configured to access a third component of the plurality of components during the runtime;
  based on determining that the first component is not configured to access the third component during the runtime, transmitting a first portion of the second subset of the monitoring data associated with the third component without transmitting a second portion of the second subset of the monitoring data associated with the third component;
  wherein the first subset of the monitoring data reflects an aspect of performance of the second component, and the second subset of the monitoring data reflects an aspect of performance of the third component.

13. The medium of claim 12, wherein the first component is associated with sufficient permissions to access both the second component and the third component.

14. The medium of claim 12, wherein identifying the set of runtime dependencies is based on one or more log files corresponding to the first component indicating access of one or more values associated with the second component.

15. The medium of claim 12, wherein identifying the set of runtime dependencies is based on searching for at least one of: (a) identifiers that are stored in association with the first component and identify the second component and (b) identifiers that are stored in association with the second component and identify the first component.

16. A system comprising:
 at least one device including a hardware processor;
 the system being configured to perform operations comprising:
 obtaining monitoring data associated with each of a plurality of components in a system;
 identifying a set of runtime dependencies between the plurality of components;
 transmitting information associated with a first component of the plurality of components, the transmitting operation comprising:
  based on the set of runtime dependencies, determining that the first component is configured to access a second component of the plurality of components during runtime;
  based on determining that the first component is configured to access the second component during the runtime, transmitting a first subset of the monitoring data that is associated with the second component;
  based on the set of runtime dependencies, determining that the first component is not configured to access a third component of the plurality of components during the runtime;
  based on determining that the first component is not configured to access the third component during the runtime, transmitting a first portion of the second subset of the monitoring data associated with the third component without transmitting a second portion of the second subset of the monitoring data associated with the third component;
  wherein the first subset of the monitoring data reflects an aspect of performance of the second component, and the second subset of the monitoring data reflects an aspect of performance of the third component.

17. The system of claim 16, wherein the first component is associated with sufficient permissions to access both the second component and the third component.

18. The system of claim 16, wherein identifying the set of runtime dependencies is based on one or more log files corresponding to the first component indicating access of one or more values associated with the second component.

19. The system of claim 16, wherein identifying the set of runtime dependencies is based on searching for at least one of: (a) identifiers that are stored in association with the first component and identify the second component and (b) identifiers that are stored in association with the second component and identify the first component.

* * * * *